No. 826,170. PATENTED JULY 17, 1906.
J. KARPEN.
SPRING BOTTOM.
APPLICATION FILED MAR. 1, 1904.
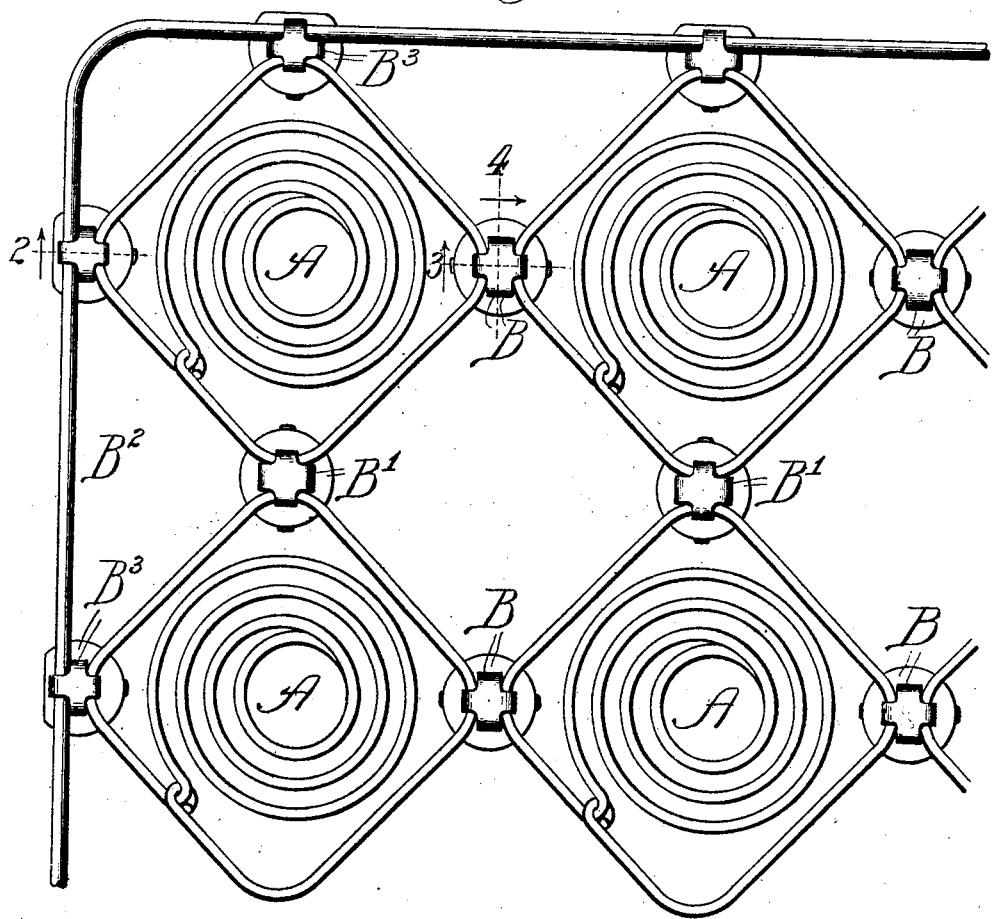
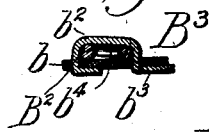
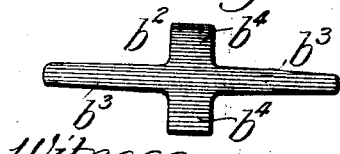
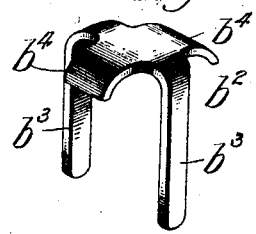
Inventor:
Julius Karpen,
By Dyrenforth, Dyrenforth & Lee,
Att'ys
THE NORRIS PETERS CO., WASHINGTON, D. C.

UNITED STATES PATENT OFFICE.

JULIUS KARPEN, OF CHICAGO, ILLINOIS, ASSIGNOR TO S. KARPEN & BROS., OF CHICAGO, ILLINOIS, A CORPORATION OF WEST VIRGINIA.

SPRING-BOTTOM.

No. 826,170.   Specification of Letters Patent.   Patented July 17, 1906.

Application filed March 1, 1904. Serial No. 196,062.

*To all whom it may concern:*

Be it known that I, JULIUS KARPEN, a citizen of the United States, residing at Chicago, in the county of Cook and State of Illinois, have invented a new and useful Improvement in Spring-Bottoms, of which the following is a specification.

My invention relates particularly to an improvement on the spring-bottom shown in the application of Isaac Karpen, Serial No. 160,174, filed June 10, 1903.

My primary object is to simplify and cheapen the construction and improve upon the operation of the spring-bottom described in said application.

The invention is illustrated in its preferred embodiment in the accompanying drawings, in which—

Figure 1 represents a broken plan view of my improved spring-bottom; Fig. 2, a section taken as indicated at line 2 of Fig. 1 and showing a detail of the connections between the marginal frame-rod and the tops of the adjacent coils; Figs. 3 and 4, sectional views taken as indicated at the corresponding lines of Fig. 1 and showing a detail of the connections used between the coil-tops; Fig. 5, a view of a blank for a clip employed; Fig. 6, a perspective view of the clip after it has been shaped from the blank, and Fig. 7 a perspective view of a washer or disk employed in connection with the clip.

In the construction shown the coil-springs A are formed with enlarged ends, preferably of substantially square formation, and are arranged with their tops corner to corner in longitudinal and transverse rows. The adjacent corners of the coil-tops are preferably slightly out of contact with each other and are pivotally united and securely joined together by connections B, having their pivots extending in one direction, and connections B', having their pivots extending at right angles to the first-named pivots. A marginal frame-rod B² is joined by connections B³ to the adjacent corners of the spring-tops.

Each connection B comprises a disk $b$, provided with suitably-spaced perforations $b'$, and a clip $b^2$, provided with two downturned relatively long prongs $b^3$, passing through the adjacent corners of the spring-tops and through the perforations in the disk $b$, the ends of the prongs being bent or clenched in opposite directions beneath the disk, said clip being further provided with two relatively short prongs $b^4$, which enter the angles between the adjacent corners of the spring-tops and bear against the upper surface of said disk. Thus the clip has bearings for the corners of the spring-tops and serves both to bind the spring-tops to the disk and to aid in maintaining the springs in proper alinement.

The details of the connections B' are similar to the details of the connections B; but the pivots thereof are evidently at right angles to the pivots at the connections B.

The details of the connections B³ are similar to those already described; but the disks are trimmed off so as not to project unduly beyond the marginal rod, and the outer prongs have their ends turned inwardly, as clearly appears from Fig. 2.

The disks which are employed are preferably of papier-mâché or other sound-deadening material.

The construction provides a cheap, effective, and practically noiseless joint, while permitting perfectly free pivotal action between the coil-tops. It is to be understood, of course, that where a double-faced spring-bottom is required the construction at the side of the spring not shown is similar to that already described. The improved construction is particularly desirable in couch construction, in which construction single-cone coils are usually employed, the coils being supported at their small ends on a suitable frame.

What I regard as new, and desire to secure by Letters Patent, is—

A spring-bottom comprising coil-springs provided with substantially square tops arranged corner to corner in longitudinal and transverse rows, and fastenings pivotally joining adjacent corners of adjacent coil-tops, each fastening comprising a sound-deadening disk provided with a pair of perforations and a clip having a pair of relatively long prongs passing through the coil-tops and disk and clenched beneath said disk and having also a pair of short downturned prongs forming bearings for the corners of the tops outside the same, for the purpose set forth.

JULIUS KARPEN.

In presence of—
M. S. MACKENZIE,
WALTER N. WINBERG.